US009992355B2

(12) United States Patent
Udaka et al.

(10) Patent No.: US 9,992,355 B2
(45) Date of Patent: Jun. 5, 2018

(54) DIAGNOSTIC APPARATUS, DIAGNOSTIC SYSTEM, AND NON-TRANSITORY COMPUTER READABLE MEDIUM

(71) Applicant: FUJI XEROX CO., LTD., Tokyo (JP)

(72) Inventors: Tsutomu Udaka, Yokohama (JP); Fumihiko Ogasawara, Yokohama (JP); Katsuyuki Kouno, Kanagawa (JP); Atsushi Ito, Kanagawa (JP); Tomoyuki Mitsuhashi, Yokohama (JP); Shinya Miyamori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/207,639

(22) Filed: Jul. 12, 2016

(65) Prior Publication Data
US 2017/0223196 A1    Aug. 3, 2017

(30) Foreign Application Priority Data

Feb. 2, 2016   (JP) .................................. 2016-018064

(51) Int. Cl.
H04R 29/00         (2006.01)
H04N 1/00          (2006.01)
(Continued)

(52) U.S. Cl.
CPC ......... *H04N 1/00037* (2013.01); *G10L 25/48* (2013.01); *H04N 1/00018* (2013.01);
(Continued)

(58) Field of Classification Search
CPC ............ H04N 1/00037; H04N 1/0018; H04N 1/00002; H04N 1/00015; H04N 1/00029;
(Continued)

(56) References Cited

U.S. PATENT DOCUMENTS 7,136,794 B1    11/2006 Bechhoefer
7,502,570 B2    3/2009 Nishimura
(Continued)

FOREIGN PATENT DOCUMENTS

JP   2007-079263 A   3/2007
JP   2008-290288 A   12/2008
WO   2010/094915 A1  8/2010

OTHER PUBLICATIONS

Office Action dated Jul. 31, 2017 by the Australian Intellectual Property Office in counterpart Australian Patent Application No. 2016210766.

*Primary Examiner* — Andrew L Sniezek
(74) *Attorney, Agent, or Firm* — Sughrue Mion, PLLC

(57) ABSTRACT

A diagnostic apparatus includes an acquiring unit that acquires sound information; a first analysis unit that performs a frequency analysis of the sound information and generates frequency analysis result data representing a temporal change in an intensity distribution for each frequency; a specifying unit that specifies a frequency of an abnormal sound in the frequency analysis result data; a second analysis unit that analyzes a frequency component of the specified frequency of the abnormal sound; and an extracting unit that extracts period information of the abnormal sound from an analysis result acquired by the second analysis unit.

13 Claims, 23 Drawing Sheets

(51) Int. Cl.
*G10L 25/48* (2013.01)
*H04R 1/08* (2006.01)
*G10L 25/18* (2013.01)
*H04R 3/00* (2006.01)
*H04R 27/00* (2006.01)

(52) U.S. Cl.
CPC .............. *H04R 1/08* (2013.01); *G10L 25/18* (2013.01); *H04R 3/00* (2013.01); *H04R 27/00* (2013.01); *H04R 2227/003* (2013.01); *H04R 2499/11* (2013.01)

(58) Field of Classification Search
CPC ........... H04N 1/00058; H04N 1/00061; G10K 2210/3025; G10K 2210/3023; H04R 29/00; H04R 29/008; G10L 25/48; B41J 29/393
See application file for complete search history.

(56) References Cited

U.S. PATENT DOCUMENTS

| | | | |
|---|---|---|---|
| 2002/0083773 A1 | 7/2002 | Ben-Romdhane | |
| 2004/0015251 A1* | 1/2004 | Hamada | G01N 29/14 700/94 |
| 2004/0136539 A1* | 7/2004 | Uhi | H04N 1/00002 381/56 |
| 2005/0204818 A1 | 9/2005 | Singhal et al. | |
| 2007/0070456 A1 | 3/2007 | Nishimura | |
| 2009/0248336 A1 | 10/2009 | Afgani et al. | |
| 2016/0112602 A1* | 4/2016 | Kawai | H04N 1/32635 358/1.14 |
| 2017/0092257 A1* | 3/2017 | Udaka | G10K 11/26 |

\* cited by examiner

FIG. 5

| MODEL NAME:ABC001 / ABC002 / ABC003 | | |
|---|---|---|
| WAVEFORM DATA OF FREQUENCY ANALYSIS RESULT | SOUND DATA OF ABNORMAL SOUND | CAUSE OF ABNORMAL SOUND | COUNTERMEASURE |
| WAVEFORM DATA 1 | SOUND DATA 1 | WEAR OF PHOTOCONDUCTOR DRUM | EXCHANGE OF PHOTOCONDUCTOR DRUM |
| WAVEFORM DATA 2 | SOUND DATA 2 | INSUFFICIENT GREASE IN SHEET CONVEYING APPARATUS | APPLICATION OF GREASE |
| ..... | ..... | ..... | ..... |
| WAVEFORM DATA 30 | SOUND DATA 30 | DEFECT IN DRIVE SYSTEM MOTOR | REPLACEMENT OF DRIVE SYSTEM MOTOR |

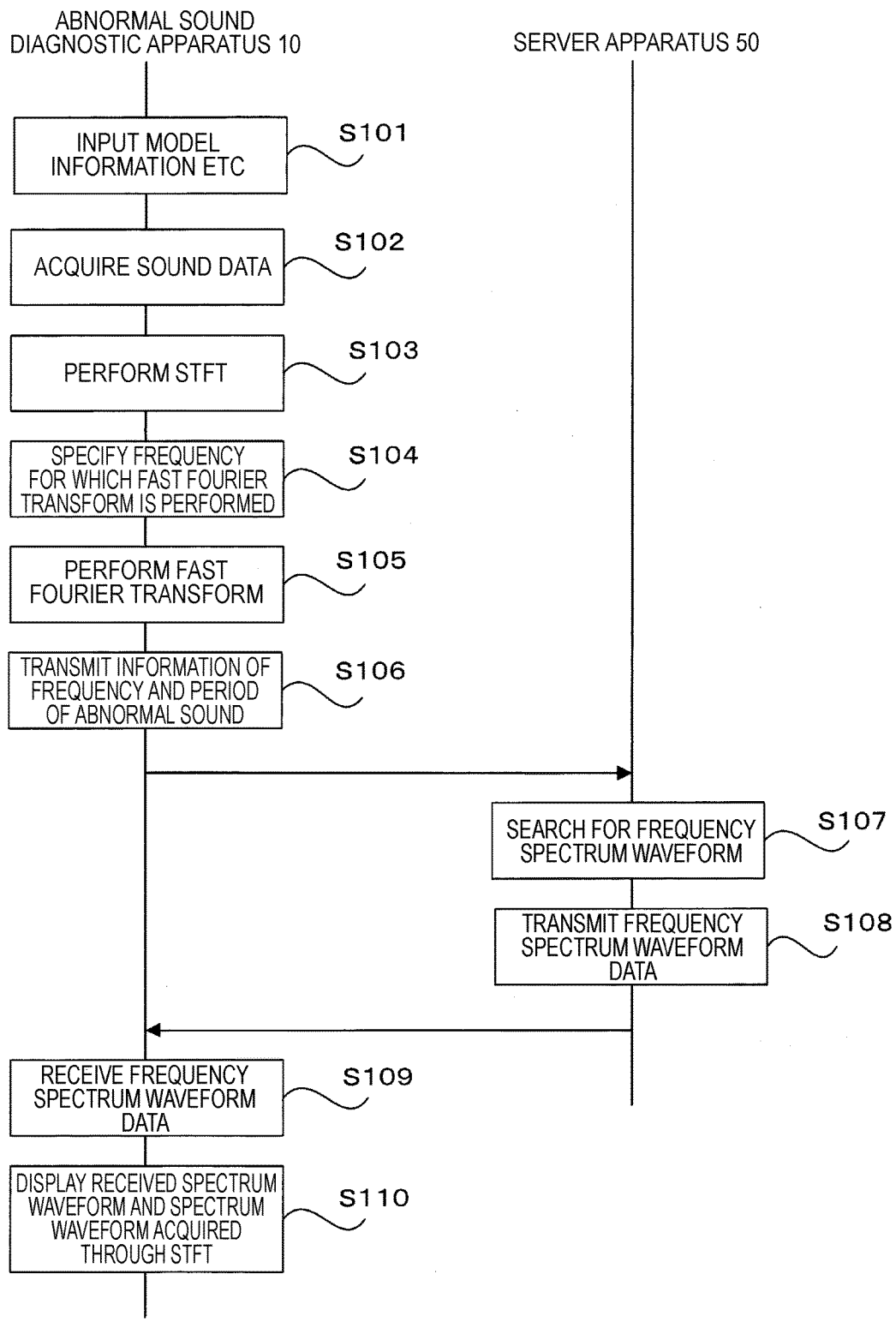

DESCRIPTION OF CONCEPT OF STFT

FIG. 15

| FREQUENCY | PERIOD |
|---|---|
| f1 | 5.2 SECONDS |
| f2 | 5.2 SECONDS |
| f3 | 5.2 SECONDS |

*FIG. 16*

| FREQUENCY | PERIOD |
|---|---|
| f1 | 5.2 SECONDS |
| f2 | 7.8 SECONDS |
| f3 | 10.5 SECONDS |

*FIG. 18*

| FREQUENCY | PERIOD |
|---|---|
| f1 | 5.2 SECONDS |
| f2 | 10.4 SECONDS |
| f3 | 10.4 SECONDS |

DIAGNOSTIC APPARATUS, DIAGNOSTIC SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-018064 filed on Feb. 2, 2016.

BACKGROUND

1. Technical Field

The present invention relates to a diagnostic apparatus, a diagnostic system, and a non-transitory computer readable medium.

SUMMARY

According to an aspect of the invention, there is provided a diagnostic apparatus including: an acquiring unit that acquires sound information; a first analysis unit that performs a frequency analysis of the sound information and generates frequency analysis result data representing a temporal change in an intensity distribution for each frequency; a specifying unit that specifies a frequency of an abnormal sound in the frequency analysis result data; a second analysis unit that analyzes a frequency component of the specified frequency of the abnormal sound; and an extracting unit that extracts period information of the abnormal sound from an analysis result acquired by the second analysis unit.

BRIEF DESCRIPTION OF THE DRAWINGS

Exemplary embodiments of the present invention will be described in detail based on the following figures, wherein:

FIG. 5 is a diagram that illustrates an instance of information stored in a waveform data storing unit 53 illustrated in FIG. 4;

FIG. 6 is a sequence chart that illustrates an operation of an abnormal sound diagnostic system according to an exemplary embodiment of the present invention;

FIG. 15 is a diagram that illustrates an instance of period information acquired by performing a fast Fourier transform for the frequencies f1, f2, and f3;

FIG. 16 is a diagram that illustrates another instance of period information acquired by performing a fast Fourier transform for the frequencies f1, f2, and f3;

FIG. 18 is a diagram that illustrates further another instance of period information acquired by performing a fast Fourier transform for the frequencies f1, f2, and f3;

DETAILED DESCRIPTION

Next, an exemplary embodiment of the present invention will be described in detail with reference to the drawings.

Figure 1:
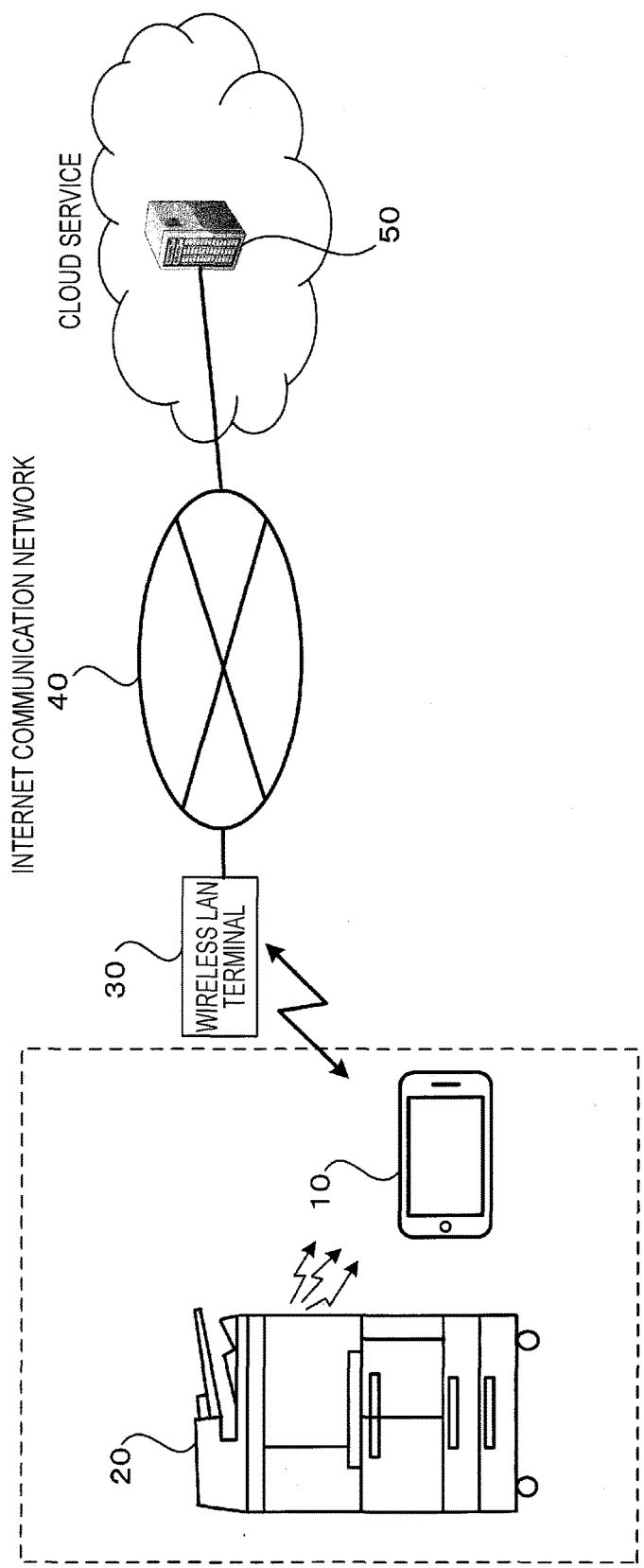
FIG. 1 is a system diagram that illustrates the configuration of an abnormal sound diagnostic system according to an exemplary embodiment of the present invention.

FIG. 1 is a system diagram that illustrates a configuration of an abnormal sound diagnostic system according to an exemplary embodiment of the present invention.

The abnormal sound diagnostic system according to an exemplary embodiment of the present invention, as illustrated in FIG. 1, is configured with: an abnormal sound diagnostic apparatus 10 such as a personal computer, a smart phone, or a tablet terminal device that is portable; and a server apparatus 50.

Any abnormal sound diagnostic apparatus is applicable to the invention, as long as the abnormal sound diagnostic apparatus 10 can be connected to the server apparatus 50 through a communication network. However, the description in this exemplary embodiment will be made using a case where the abnormal sound diagnostic apparatus 10 is a tablet terminal device which is provided with a device such as a microphone to acquire a sound signal and a touch panel to receive a touch input.

The abnormal sound diagnostic apparatus 10 is carried by a service engineer (maintenance personnel) who maintains or repairs an image forming apparatus 20 such as a printer used by an end user, and is used to acquire an abnormal sound (extraordinary sound) signal generated in the image forming apparatus 20 for a frequency analysis on the acquired abnormal sound signal, or to display a waveform obtained as a result of the frequency analysis on the abnormal sound signal acquired from the server apparatus 50 in the past together with the waveform obtained as a result of the frequency analysis on the acquired abnormal sound signal.

The abnormal sound diagnostic apparatus 10 and the server apparatus 50 are connected to each other through a wireless LAN terminal 30 such as a Wi-Fi router or an Internet communication network 40, and transmit and receive information.

In a case where the abnormal sound diagnostic apparatus 10 is a mobile phone device or a smart phone, the abnormal sound diagnostic apparatus 10 and the server apparatus 50 may be connected to each other through a mobile phone network and transmit/receive waveform data obtained as a result of the frequency analysis.

In the abnormal sound diagnostic system according to this exemplary embodiment, in a case where an abnormal sound is generated in the image forming apparatus 20 that is a target electronic apparatus installed in a place of the end user, a service engineer goes to that place of the image forming apparatus 20 with the abnormal sound diagnostic apparatus 10. The service engineer acquires an abnormal sound signal by recording the generated abnormal sound using the abnormal sound diagnostic apparatus 10 and performs an abnormal sound diagnosis specifying a cause of the abnormal sound.

Further, it is also technically possible to provide a microphone in the image forming apparatus 20 to have a sound recording function so as to record the abnormal sound when the abnormal sound is generated. However, in a case where the image forming apparatus 20 is installed in an office of the end user, it may be not realized to provide the sound recoding function in the image forming apparatus 20 due to a security problem.

Figure 2:
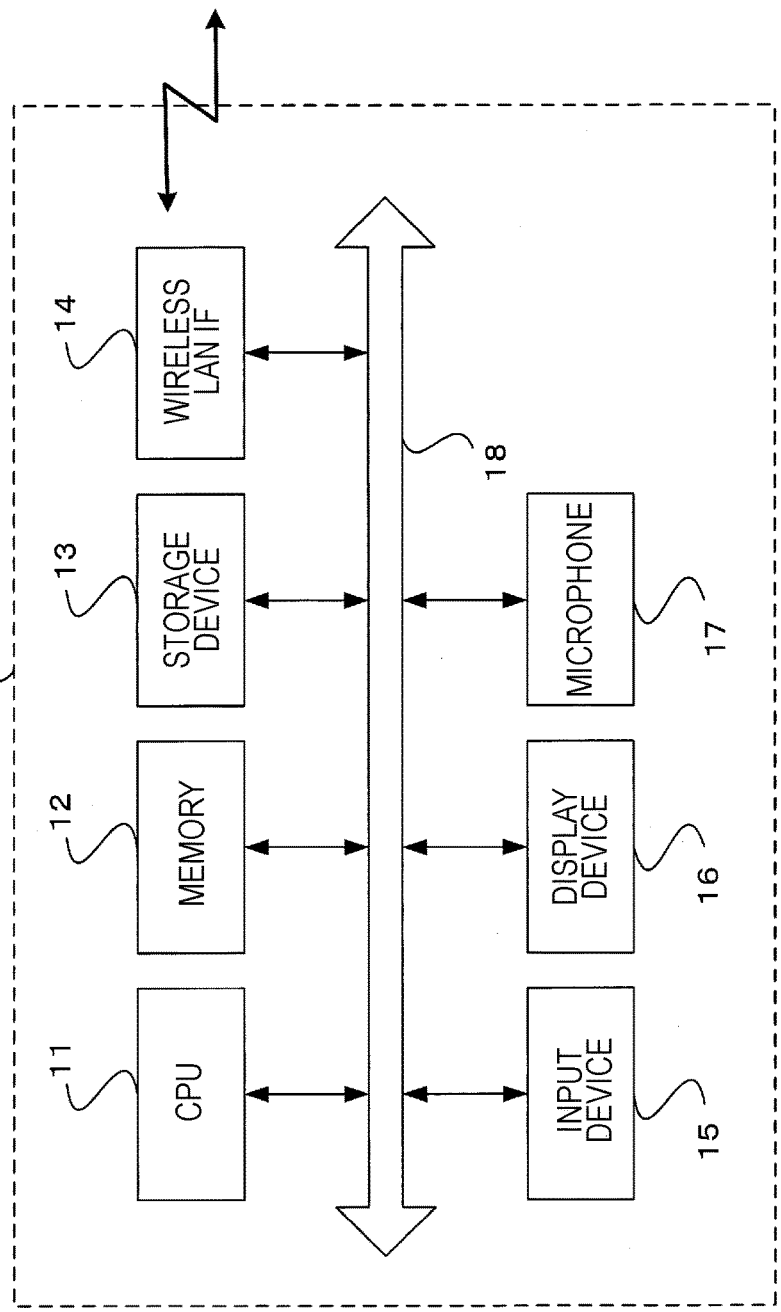
FIG. 2 is a block diagram that illustrates a hardware configuration of an abnormal sound diagnostic apparatus 10 according to the exemplary embodiment of the present invention.

Next, a hardware configuration of the abnormal sound diagnosis apparatus 10 in the abnormal sound diagnostic system of this exemplary embodiment is illustrated in FIG. 2.

The abnormal sound diagnostic apparatus 10, as illustrated in FIG. 2, includes: a CPU 11; a memory 12 that can temporarily store data; a storage device 13 such as a flash memory; a wireless LAN interface (I/F) 14 that transmits/receives data by wirelessly communicating with the wireless LAN terminal 30; an input device 15 such as a touch sensor; a display device 16; and a microphone 17. Such constituent elements are interconnected through a control bus 18.

In the abnormal sound diagnostic apparatus 10 according to this exemplary embodiment, a touch panel on which a touch sensor used for detecting a touch position on the display device 16 is disposed as the input device 15 is included, and, by using this touch panel, display is performed, and an input is made from a user.

The CPU 11 performs a predetermined process based on a control program stored in the memory 12 or the storage device 13, thereby controlling the operation of the abnormal sound diagnostic apparatus 10. This control program may be acquired by being downloaded through the Internet communication network 40 or the mobile phone network and be supplied to the CPU 11, or the program may be stored on a storage medium such as a CR-ROM and be supplied to the CPU 11.

As the control program described above is executed, the abnormal sound diagnostic apparatus 10 according to this exemplary embodiment performs operations to be described below and supports service engineer's operation for specifying the cause of the abnormal sound.

Figure 3:
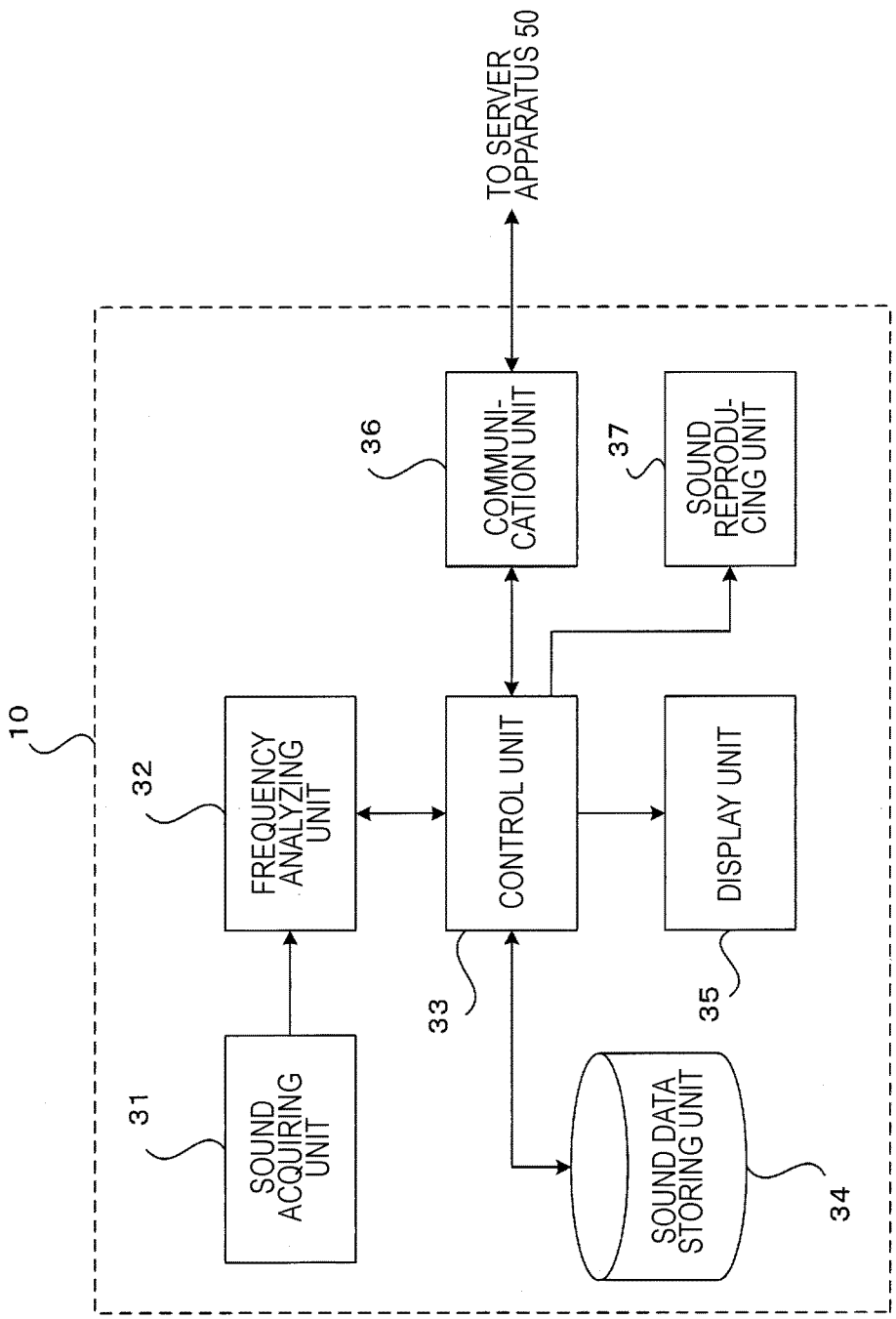
FIG. 3 is a block diagram that illustrates a functional configuration of the abnormal sound diagnostic apparatus 10 according to the exemplary embodiment of the present invention.

FIG. 3 is a block diagram that illustrates a functional configuration of the abnormal sound diagnostic apparatus 10 that is realized by executing the control program described above.

The abnormal sound diagnostic apparatus 10 according to this exemplary embodiment, as illustrated in FIG. 3, includes: a sound acquiring unit 31; a frequency analyzing unit 32; a control unit 33; a sound data storing unit 34; a display unit 35; a communication unit 36; and a sound reproducing unit 37.

The display unit 35 performs display of various kinds of data under the control of the control unit 33. The communication unit 36 communicates with the server apparatus 50 that is an external device. The sound reproducing unit 37 reproduces recorded sound data or the like and converts the sound data or the like as a sound signal under the control of the control unit 33.

The sound acquiring unit 31 acquires a sound signal by receiving an abnormal sound generated in the image forming apparatus 20 that is an analysis target apparatus as input.

In this exemplary embodiment, while the sound acquiring unit 31 is described to acquire a sound signal as the sound acquiring unit 31 receives an abnormal sound generated in the image forming apparatus 20 as input, the sound signal is an instance of sound information.

The frequency analyzing unit 32 performs a time frequency analysis (time-dependent frequency analysis) of a sound signal acquired by the sound acquiring unit 31 and generates frequency spectrum waveform (frequency analysis result) data representing a temporal change in a signal intensity distribution for each frequency of the acquired abnormal sound signal.

Specifically, the frequency analyzing unit 32 generates frequency spectrum waveform data by performing a short time Fourier transform (STFT) of a sound signal acquired by the sound acquiring unit 31. The STFT will be described below.

The control unit 33 stores the frequency spectrum waveform data acquired by the frequency analyzing unit 32 in the sound data storing unit 34 together with sound data. Then, the control unit 33 displays a frequency spectrum waveform acquired as a result of the STFT on the display unit 35 that is a touch panel.

In addition, the control unit 33 specifies a frequency of an abnormal sound in the frequency spectrum waveform data acquired by the frequency analyzing unit 32.

Specifically, the control unit 33 calculates a total sum of sound intensities in a time-axis direction for each frequency in the frequency spectrum waveform data acquired by the frequency analyzing unit 32 and detects a peak (maximum value) in the calculated total sum of the sound intensities for each frequency, thereby specifying a frequency of the abnormal sound.

Since there are also cases where plural peaks are present in the frequency spectrum waveform data, in this exemplary embodiment, the control unit 33 calculates a total sum of sound intensities in the time-axis direction for each frequency in the frequency spectrum waveform data, detects a peak in the calculated total sum of the sound intensities for each frequency, and specifies a frequency for which a difference between the peak and a total sum of sound intensities of another adjacent frequency is a value set in advance or more as a frequency of an abnormal sound.

In addition, since a signal component of a low frequency that is a predetermined frequency or less is undistinguishable from a normal operation sound, the control unit 33 may be configured not to specify a frequency of a maximum value as a frequency of an abnormal sound even in a case where the maximum value is detected in an area of frequencies set in advance, for instance, an area of 2 kHz or less. In such a case, the area of the frequencies set in advance may be set for each type of apparatus.

When the frequency of the abnormal sound is specified in this way, the control unit 33 instructs the frequency analyzing unit 32 to perform a fast Fourier transform (1D-fast Fourier transform (FFT)) performing a frequency analysis in the time-axis direction for a frequency component including the specified frequency of the abnormal sound among the frequency spectrum waveform data acquired by the frequency analyzing unit 32. For this reason, the frequency analyzing unit 32 performs the fast Fourier transform in the time-axis direction for the frequency component of the abnormal sound that is specified by the control unit 33.

In a case where the frequency of an abnormal sound cannot be specified by the control unit 33, the frequency analyzing unit 32 performs the fast Fourier transform in the time-axis direction for a frequency component set in advance such as 4 kHz or 8 kHz.

Then, the control unit 33 extracts information of a period and a frequency of an abnormal sound from an analysis result of the fast Fourier transform acquired by the frequency analyzing unit 32.

In addition, in a case where plural frequencies of abnormal sounds are specified, and plural periods of the abnormal sounds are detected through the analysis performed by the frequency analyzing unit 32 for the plural specified frequency components of the abnormal sounds, the control unit 33 may be configured to extract a period of a frequency having a largest value of the calculated total sum of sound intensities for the frequencies from among periods of the plural frequencies of the abnormal sounds as period information of the abnormal sound.

In a case where plural frequencies of abnormal sounds are specified, and plural periods of the abnormal sounds are detected through the analysis performed by the frequency analyzing unit 32 for the plural specified frequency components of the abnormal sounds, the control unit 33 may be configured to extract a period of a frequency having a largest difference between a value of a calculated total sum of sound intensities for the frequency and a value of a total sum of sound intensities of another adjacent frequency from among periods of the plural frequencies of the abnormal sounds as period information of the abnormal sound.

In a case where plural frequencies of abnormal sounds are specified, and plural periods of the abnormal sounds are detected through the analysis performed by the frequency analyzing unit 32 for the plural specified frequency components of the abnormal sounds, the control unit 33 may be configured to extract a shortest period from among periods of the plural frequencies of abnormal sounds as period information of the abnormal sound.

In addition, the control unit 33 transmits the acquired information of the period and the frequency of the abnormal sound to the server apparatus 50 through the communication unit 36 together with model information such as a model name, a serial number, and the like of the image forming apparatus 20 and operation state information representing an operation state of the image forming apparatus 20. Specifically, in this operation state information, information such as color print/monochrome print, single-side print/both-side print, one of scanning, print, and copy as an operation mode, and the kind of used sheets may be included. In this way, the control unit 33 transmits the information acquired from the frequency spectrum waveform data that is acquired by the frequency analyzing unit 32 to the server apparatus 50 through the communication unit 36.

The server apparatus 50 stores the spectrum waveform data acquired through the frequency analysis of sound signals of abnormal sounds generated in the past in an apparatus equivalent to the image forming apparatus 20 together with information such as original sound data, an operation state of the apparatus at the time of acquisition of the sound data, a cause of the abnormal sound, and a countermeasure for the abnormal sound.

The server apparatus 50 searches for frequency spectrum waveform data corresponding to the frequency spectrum waveform data acquired as a result of the frequency analysis performed by the frequency analyzing unit 32 based on the information of the period and the frequency of the abnormal sound transmitted from the abnormal sound diagnostic apparatus 10 and transmits found frequency spectrum waveform data to the abnormal sound diagnostic apparatus 10 together with information such as sound data stored as sample waveform data of the abnormal sound and the like.

As a result, the control unit 33 receives the frequency spectrum waveform data corresponding to the frequency spectrum waveform data acquired as the result of the frequency analysis performed by the frequency analyzing unit 32 from the server apparatus 50 through the communication unit 36.

The control unit 33 displays the frequency spectrum waveform acquired through the frequency analysis of the sound signal acquired by the sound acquiring unit 31 and the spectrum waveform received from the server apparatus 50 on the display unit 35 in a parallel manner.

In a case where there are plural frequency spectrum waveform data transmitted from the server apparatus 50, the control unit 33 controls the display unit 35 such that data having a high degree of similarity to the frequency spectrum waveform data obtained through the frequency analysis of the frequency analyzing unit 32 is displayed by priority among the plural frequency spectrum waveform data.

Next, a functional configuration of the server apparatus 50 of the abnormal sound diagnostic system according to this exemplary embodiment will be described with reference to a block diagram illustrated in FIG. 4.

Figure 4:
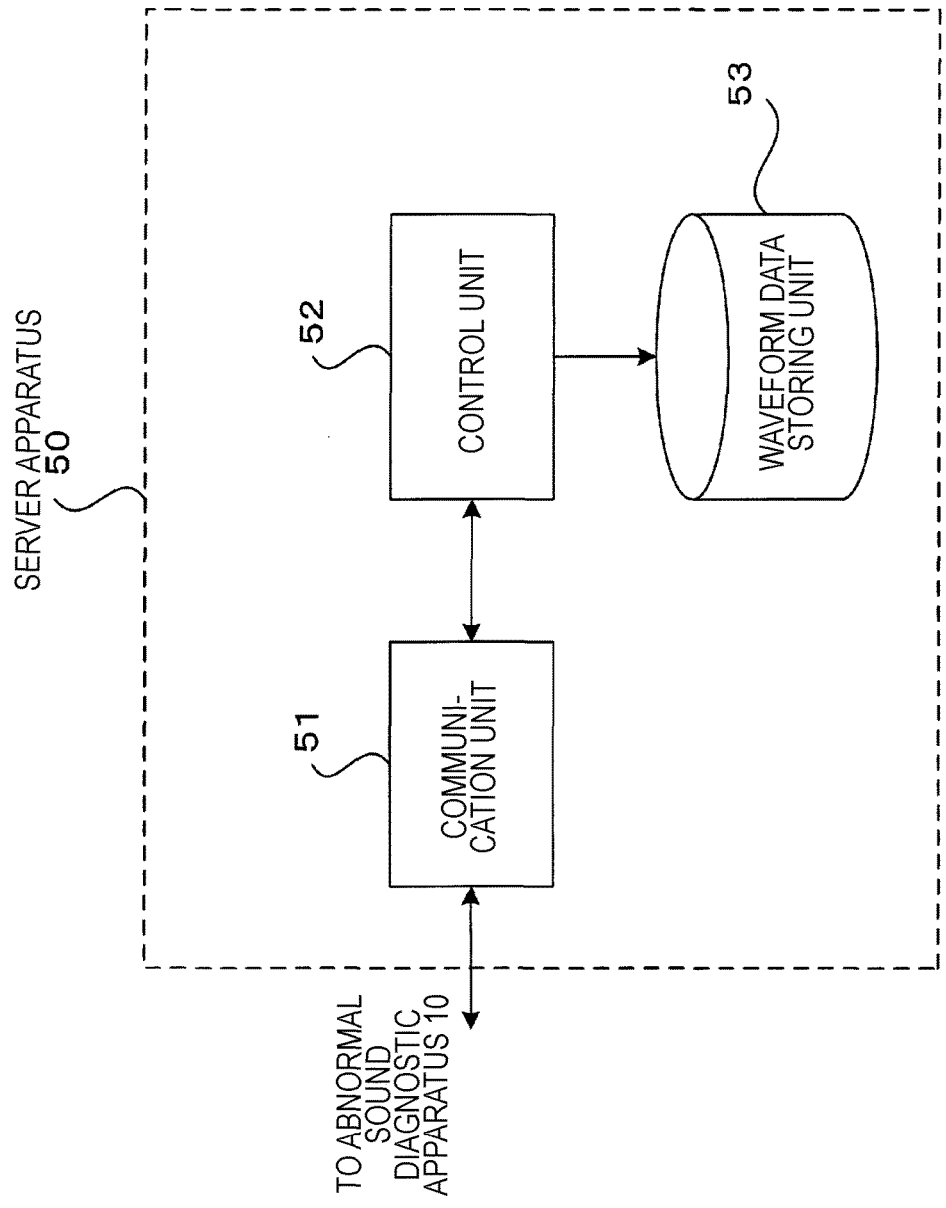
FIG. 4 is a block diagram that illustrates a functional configuration of a server apparatus 50 according to the exemplary embodiment of the present invention.

The server apparatus 50 according to this exemplary embodiment, as illustrated in FIG. 4 includes: a communication unit 51; a control unit 52; and a waveform data storing unit 53.

The waveform data storing unit 53 stores plural pieces of frequency spectrum waveform data acquired by performing the frequency analysis of sound signals of abnormal sounds generated in the past in an apparatus equivalent to the image forming apparatus 20 that is an analysis target apparatus.

Specifically, the waveform data storing unit 53, as illustrated in FIG. 5, stores information such as frequency spectrum waveform data acquired through the time frequency analysis of sound data of an abnormal sound acquired in advance, sound data as a source, a cause of the abnormal sound, and a countermeasure thereof for each model.

In a case where the information of the period and the frequency of an abnormal sound is received from the abnormal sound diagnostic apparatus 10, the control unit 52 selects waveform data similar to the waveform data of the frequency spectrum that is based on the abnormal sound acquired by the abnormal sound diagnostic apparatus 10 from among waveform data of plural frequency spectrums stored in the waveform data storing unit 53 based on the received information of the period and the frequency of the abnormal sound and transmits the selected waveform data to the abnormal sound diagnostic apparatus 10 through the communication unit 51.

Next, the operation of the abnormal sound diagnostic system according to this exemplary embodiment will be described with reference to a sequence chart illustrated in FIG. 6.

Figure 7:
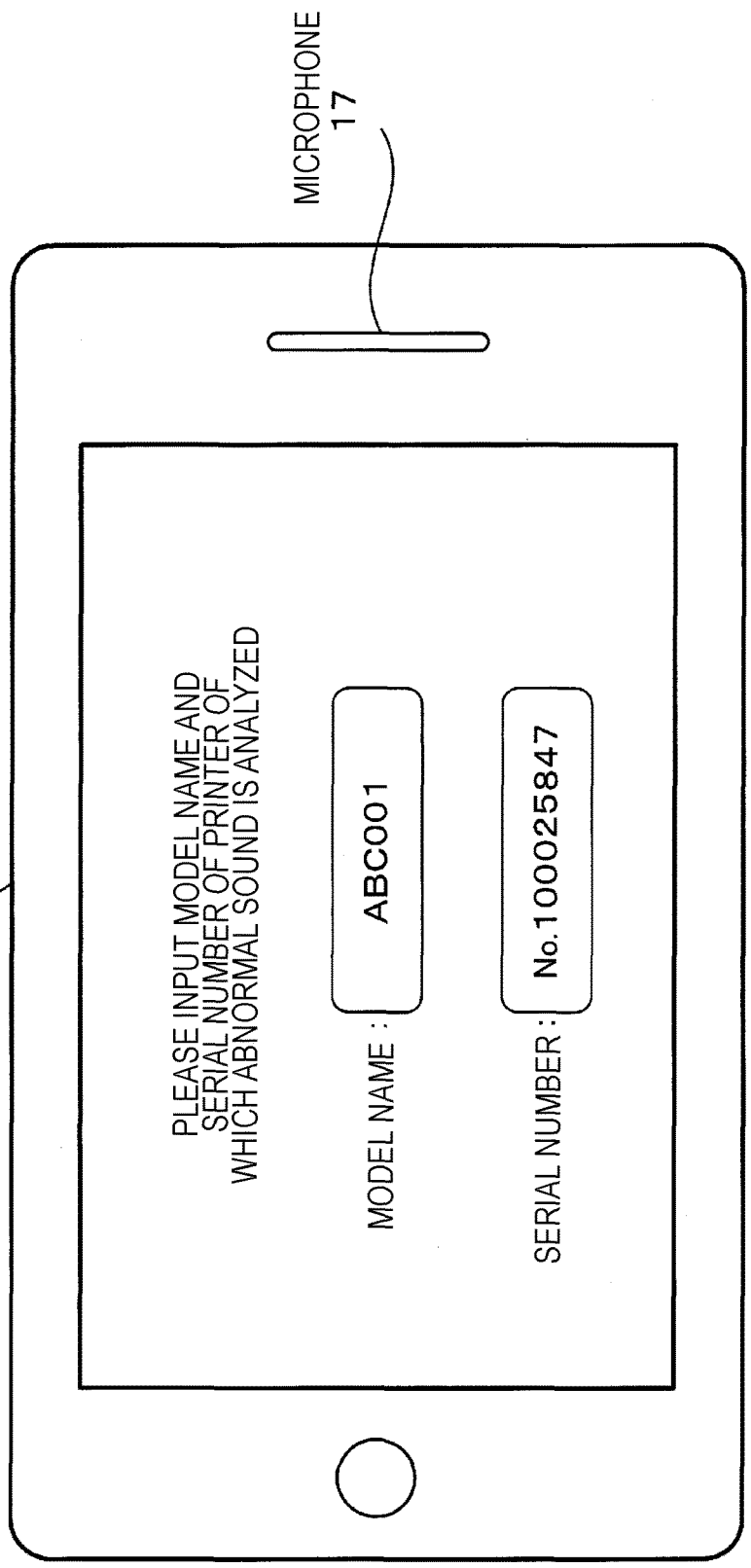
FIG. 7 is a diagram that illustrates an instance of a display screen of the abnormal sound diagnostic apparatus 10 at the time of inputting various kinds of information such as a model name, a serial number, and an operation state.

In the abnormal sound diagnostic apparatus 10, in a case where an abnormal sound diagnosis for specifying a cause of an abnormal sound is to be performed, an image as illustrated in FIG. 7 is displayed, and various kinds of information such as a model name, a serial number, and an operation state is input (Step S101).

Then, the abnormal sound diagnostic apparatus 10 sets the operation mode to a sound recording mode and records an abnormal sound by causing the microphone 17 to approach an abnormal sound generation place in the image forming apparatus 20, thereby acquiring sound data (Step S102).

In the abnormal sound diagnostic apparatus 10, an STFT of the acquired sound data is performed by the frequency analyzing unit 32, and accordingly, a frequency spectrum waveform representing a temporal change in the signal intensity distribution for each frequency is generated (Step S103).

Figure 8:
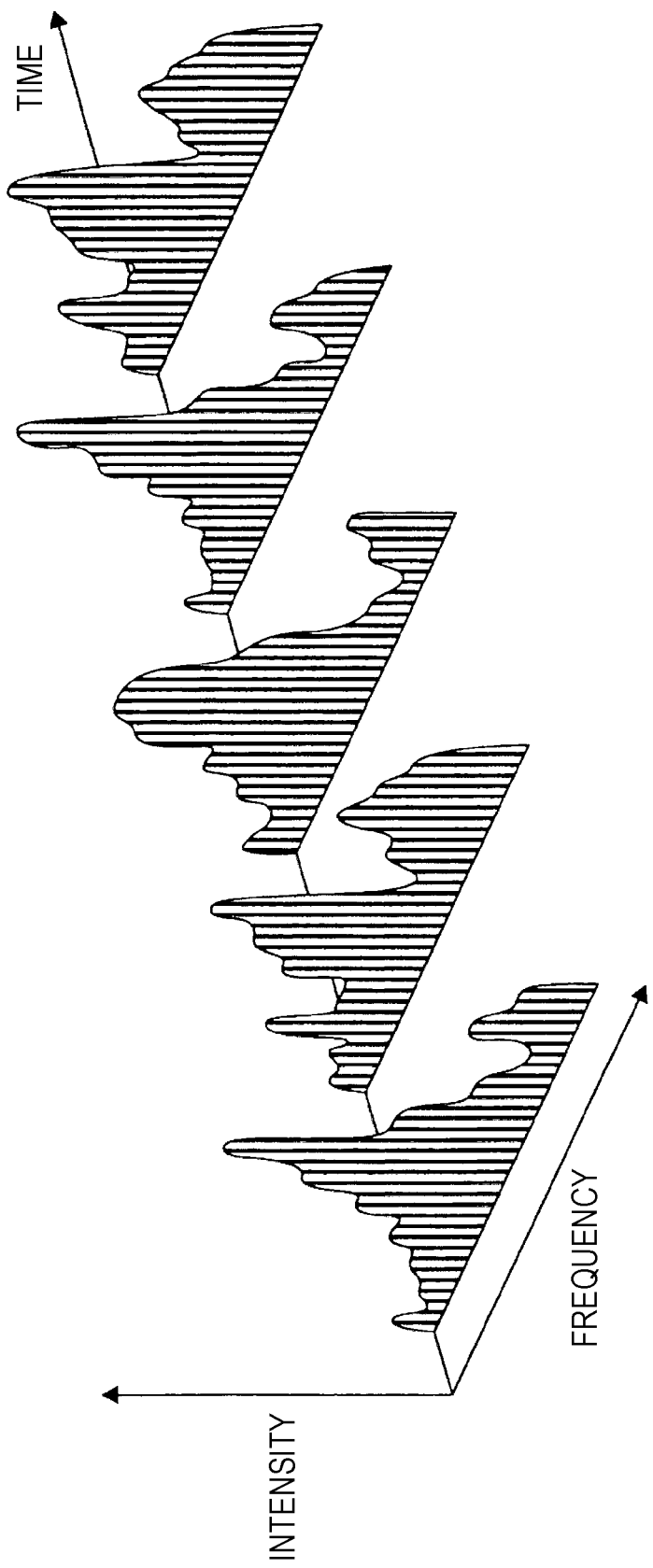
FIG. 8 is a diagram that illustrates a concept of a STFT.

The STFT, as illustrated in FIG. 8, represents calculating of a signal intensity for each frequency component according to a temporal change by performing a Fourier transform for every short time. An instance of the waveform of a case where a result of the analysis acquired through the STFT is formed as an image of one frequency spectrum waveform is illustrated in FIG. 9.

Figure 9:
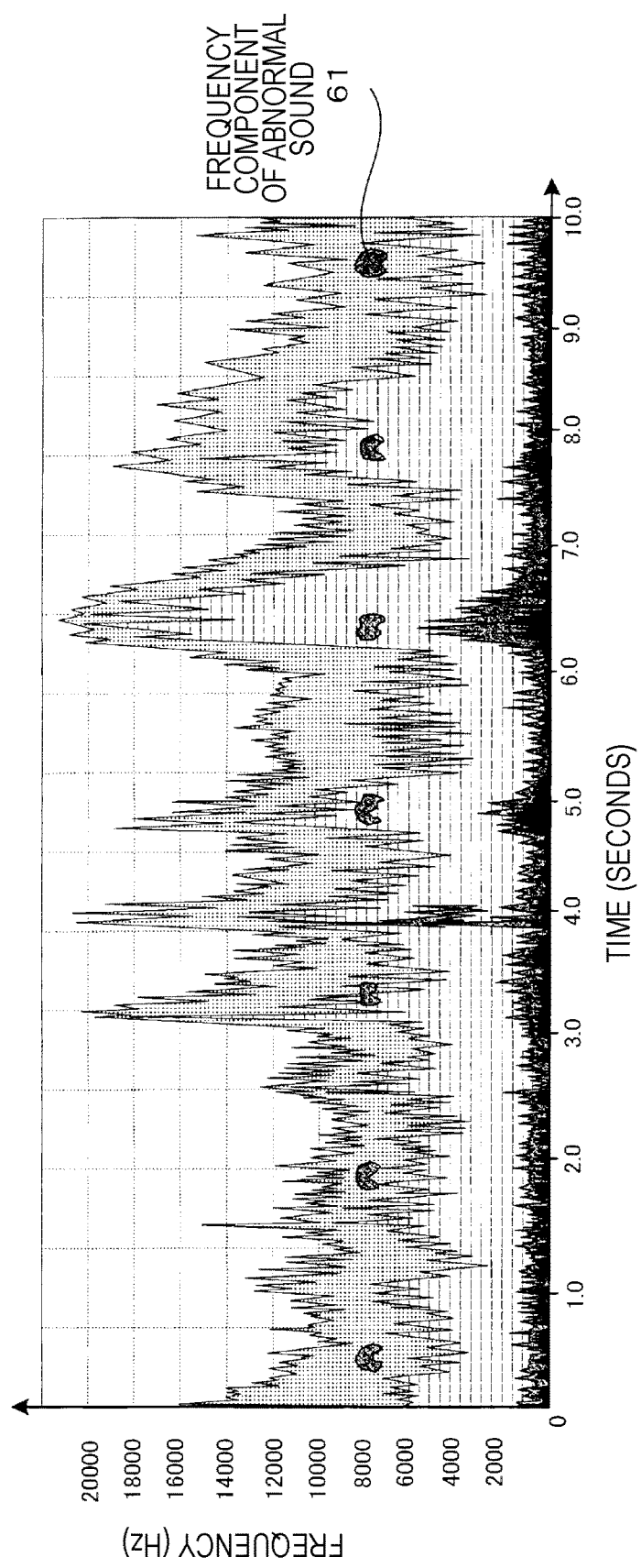
FIG. 9 is a diagram that illustrates an instance of an image of a frequency spectrum waveform based on an analysis result acquired through the STFT.

In the instance of the frequency spectrum waveform illustrated in FIG. 9, the horizontal axis represents the time, the vertical axis represents the frequency, and an intensity for each frequency is represented using a color. In FIG. 9, differences in the color are represented using hatching patterns. In FIG. 9, while a case in which the intensity for each frequency is represented using a color is illustrated as an instance, the intensity may be represented using a gray scale.

In the instance of the frequency spectrum waveform illustrated in FIG. 9, it is understood that a frequency component 61 of an abnormal sound is periodically generated to be displayed at a specific frequency. In the instance of the frequency spectrum waveform illustrated in FIG. 9, a low-frequency component is a normal operation sound but is not a frequency component of an abnormal sound.

When the frequency spectrum waveform as illustrated in FIG. 9 is acquired, the control unit 33 displays the frequency spectrum waveform on the display unit 35.

In addition, the control unit 33 performs the process of specifying a frequency for which a fast Fourier transform is performed by specifying the frequency of the abnormal sound from the frequency spectrum waveform (Step S104). This process of specifying the frequency of an abnormal sound will be described using another frequency spectrum waveform illustrated in FIG. 10.

Figure 10:
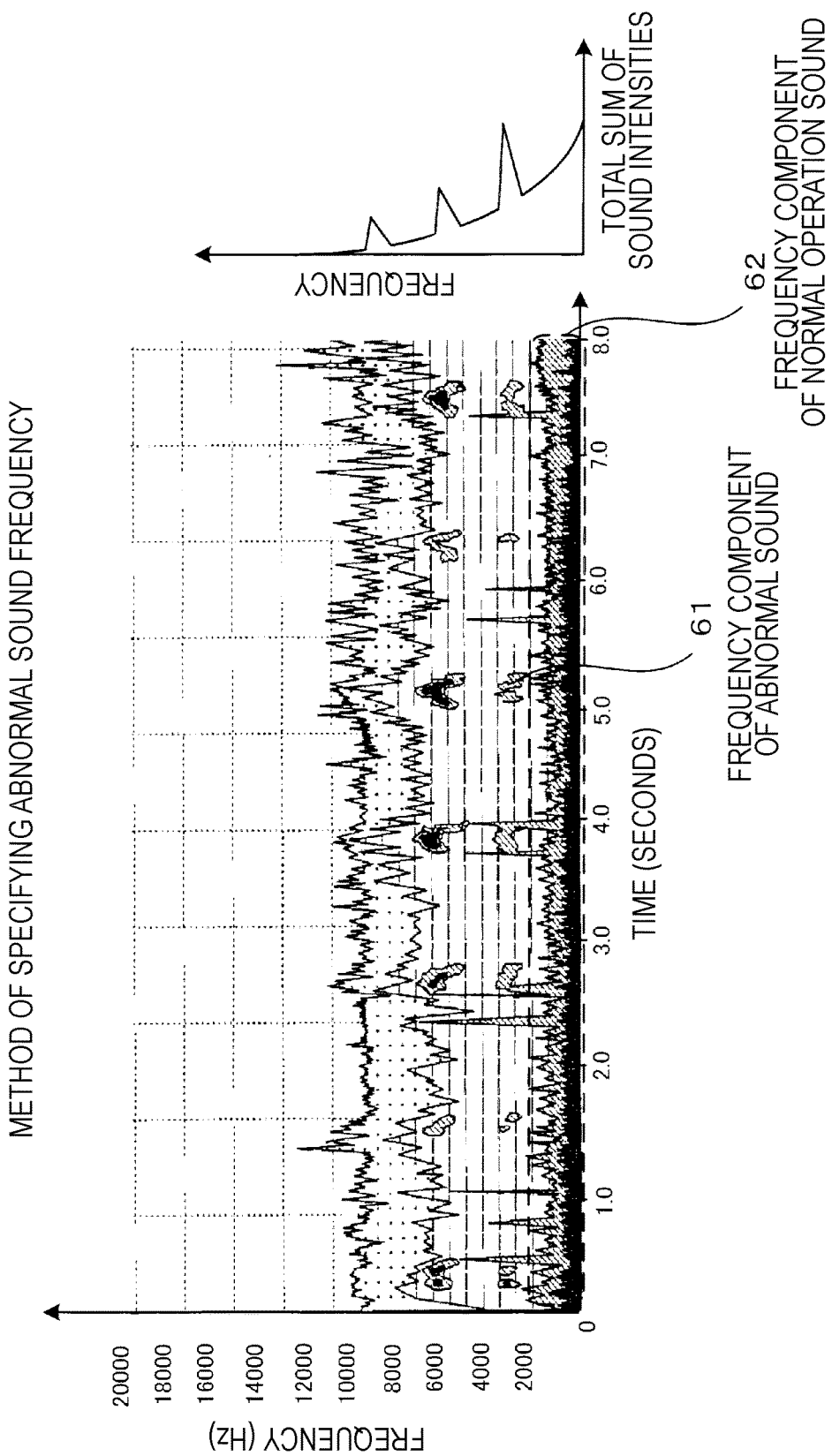
FIG. 10 is a diagram that illustrates an instance of a frequency spectrum waveform for illustrating an abnormal sound frequency specifying process.

First, the control unit 33, as illustrated in FIG. 10, calculates a total sum of sound intensities in the time-axis direction for each frequency in the frequency spectrum waveform data. By calculating a total sum of sound intensities for each frequency in this way, for a frequency at which an abnormal sound is included, the value of a total sum is larger than that for any other frequency. A graph of the total sum of sound intensities illustrated in FIG. 10 represents not an actual total sum value but a schematic total sum.

Figure 11:
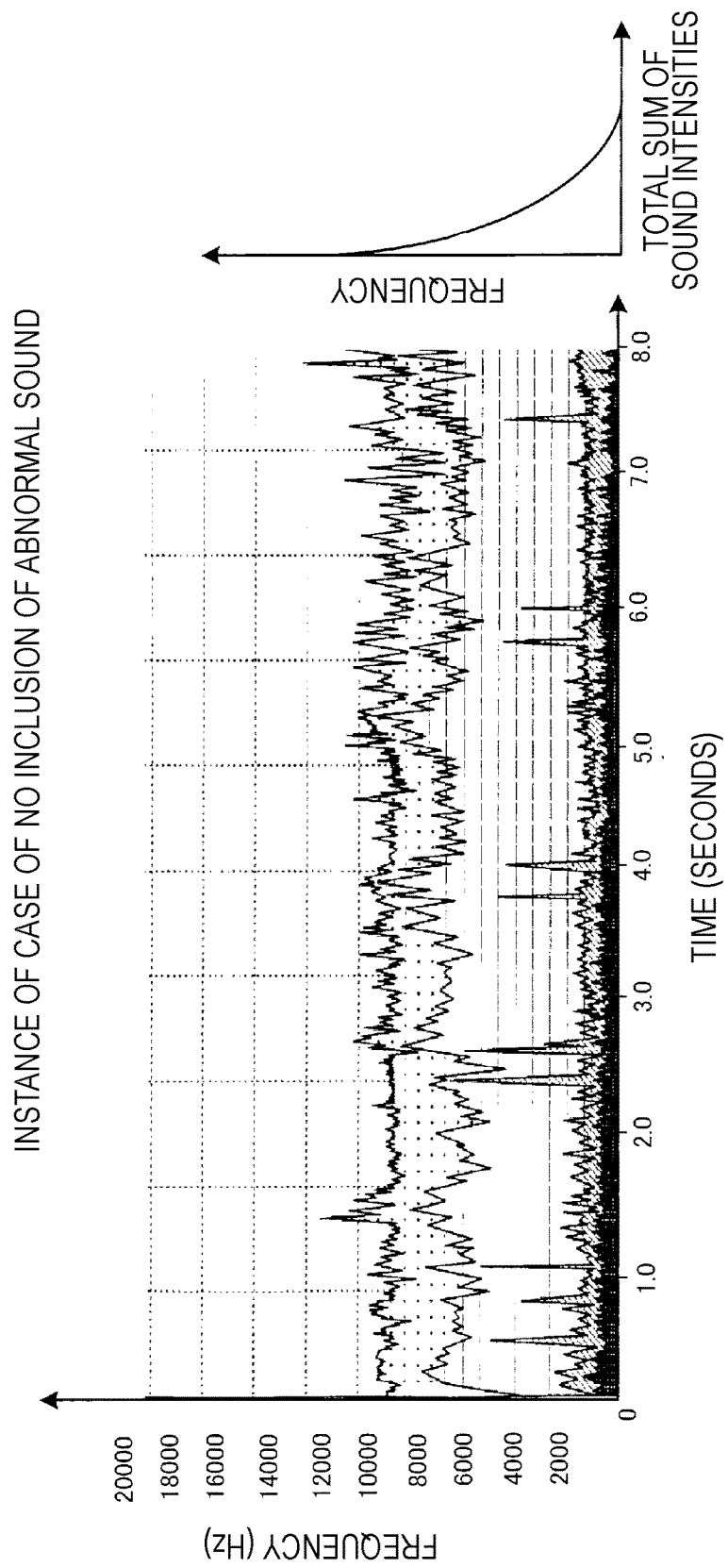
FIG. 11 is a diagram that illustrates an instance of a case where a total sum of sound intensities in a time-axis direction for frequencies in a frequency spectrum waveform data of a sound not including an abnormal sound.

For a comparison, an instance of a case where a total sum of sound intensities in the time-axis direction for each frequency is calculated for the frequency spectrum waveform data of a sound not including an abnormal sound is illustrated in FIG. 11. In the instance illustrated in FIG. 11, it can be understood that, since an abnormal sound is not included, a peak that becomes a maximum value is not generated also for a total sum value of sound intensities.

The control unit 33 detects a peak in the calculated total sum of sound intensities for each frequency and specifies a frequency for which a difference between the peak and a total sum of sound intensities of another adjacent frequency is a value set in advance or more as a frequency of an abnormal sound.

Figure 12:
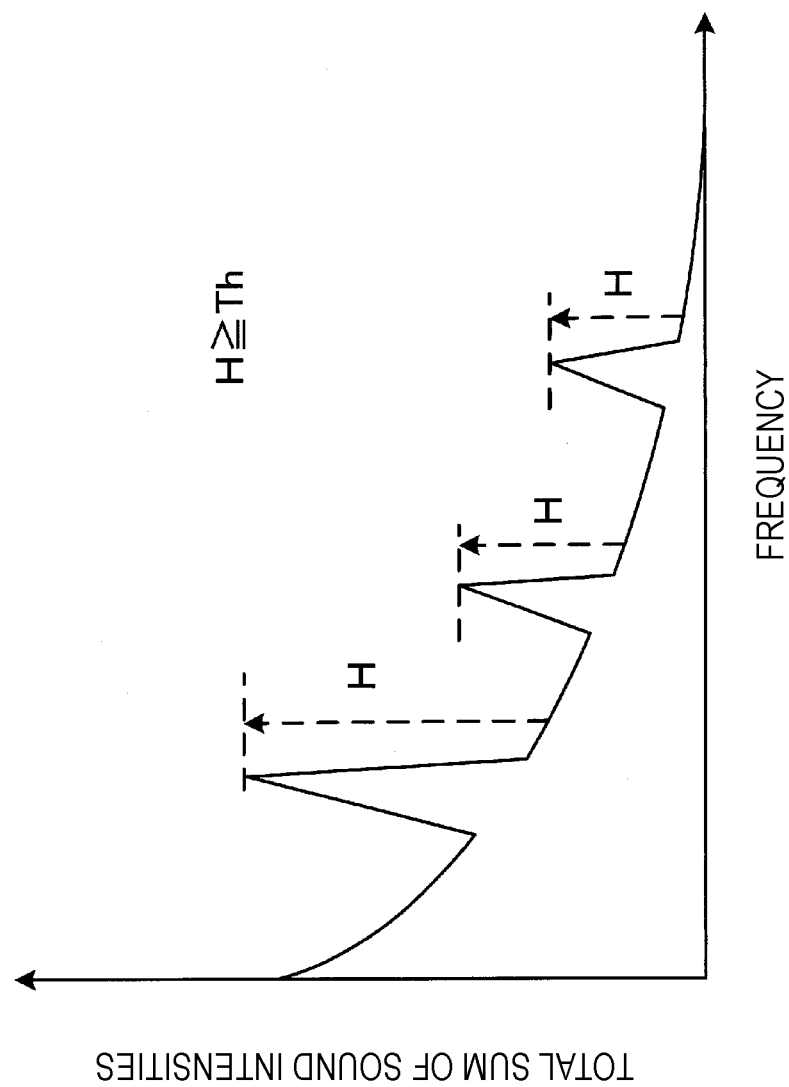
FIG. 12 is a diagram that illustrates a specific method for detecting a peak from a total sum of sound intensities for frequencies.

A specific method of detecting a peak from a total sum of sound intensities for each frequency will be described with reference to FIG. 12. As an instance of the peak detection, a method may be used in which differential processing is performed for graph data of a total sum of sound intensities as illustrated in FIG. 12, and a point at which the inclination changes from positive to negative is detected as a peak. In the instance illustrated in FIG. 12, for instance, in a case where a difference H between the value of the detected peak and a value for a frequency that is not an adjacent peak is a threshold Th set in advance or more, the frequency of the peak is specified as a frequency of an abnormal sound.

When the difference H between the value of the peak and a value for a frequency that is not an adjacent peak is calculated, a difference from a minimum value between the peak value and another peak adjacent to the peak may be calculated as the value of the difference H.

Figure 13:
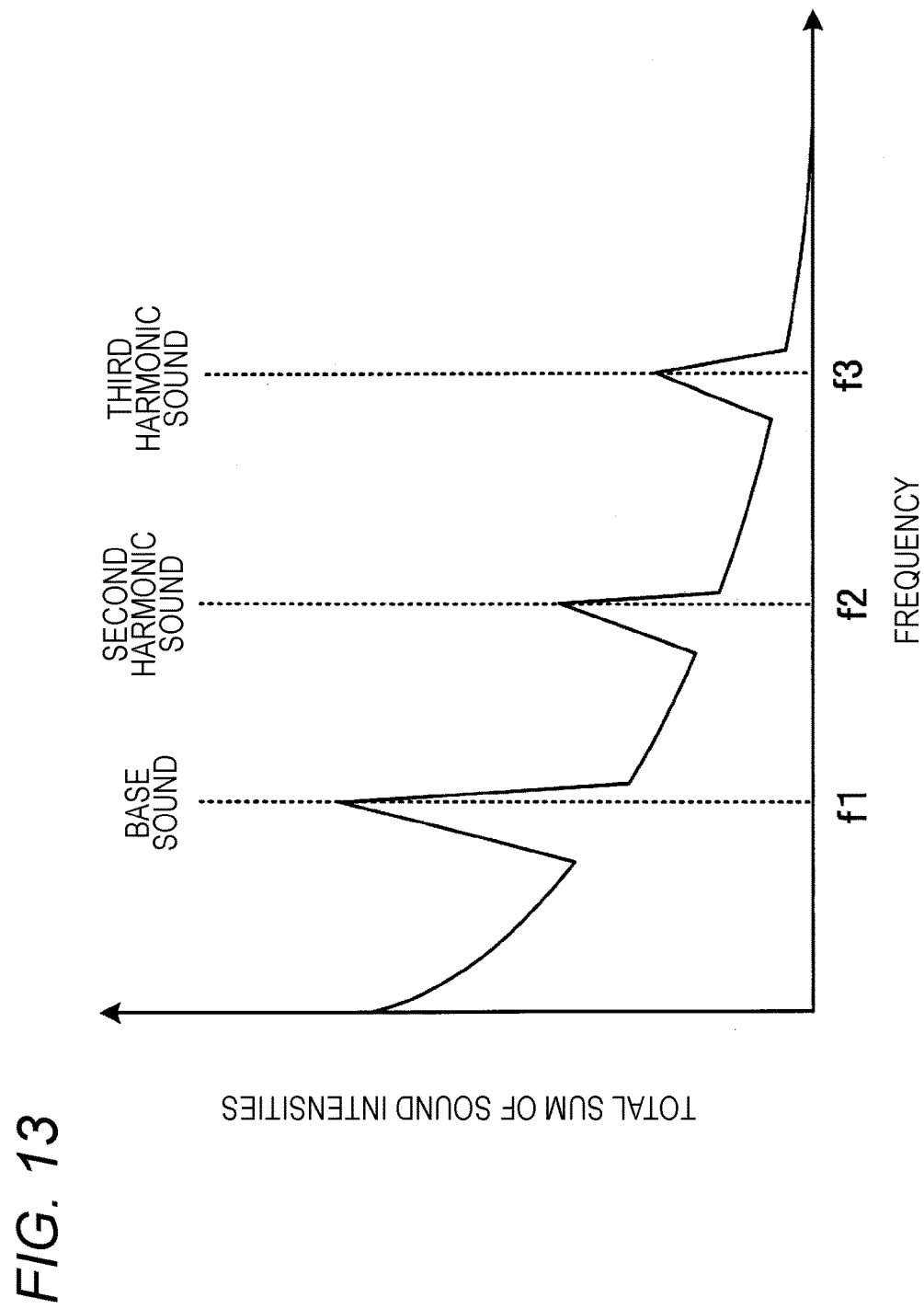
FIG. 13 is a diagram that illustrates an appearance of specifying three frequencies including frequencies f1, f2, and f3 as frequencies of abnormal sounds from a graph of a total sum of sound intensities for the frequencies illustrated in FIG. 12.

Then, the control unit 33, as illustrated in FIG. 13, specifies frequencies of detected peaks as frequencies of abnormal sounds. In case illustrated in FIG. 13, three frequencies f1, f2, and f3 are specified as frequencies of abnormal sounds. Here, in a case where a frequency analysis of an abnormal sound is performed, there are cases where harmonic sound components such as a second harmonic sound, a third harmonic sound, and the like of the abnormal sound are detected in addition to a base sound of the abnormal sound. In the instance illustrated in FIG. 13, the frequency f1 corresponds to the base sound of the abnormal sound, the frequency f2 corresponds to the second harmonic sound of the abnormal sound, and the frequency f3 corresponds to the third harmonic sound of the abnormal sound.

Then, when the frequencies for which a fast Fourier transform is performed are specified, the fast Fourier transform (1D-FFT) of the frequency components is performed by the frequency analyzing unit 32 (Step S105). An instance of an analysis result of the fast Fourier transform performed in this way is illustrated in FIG. 14.

Figure 14:
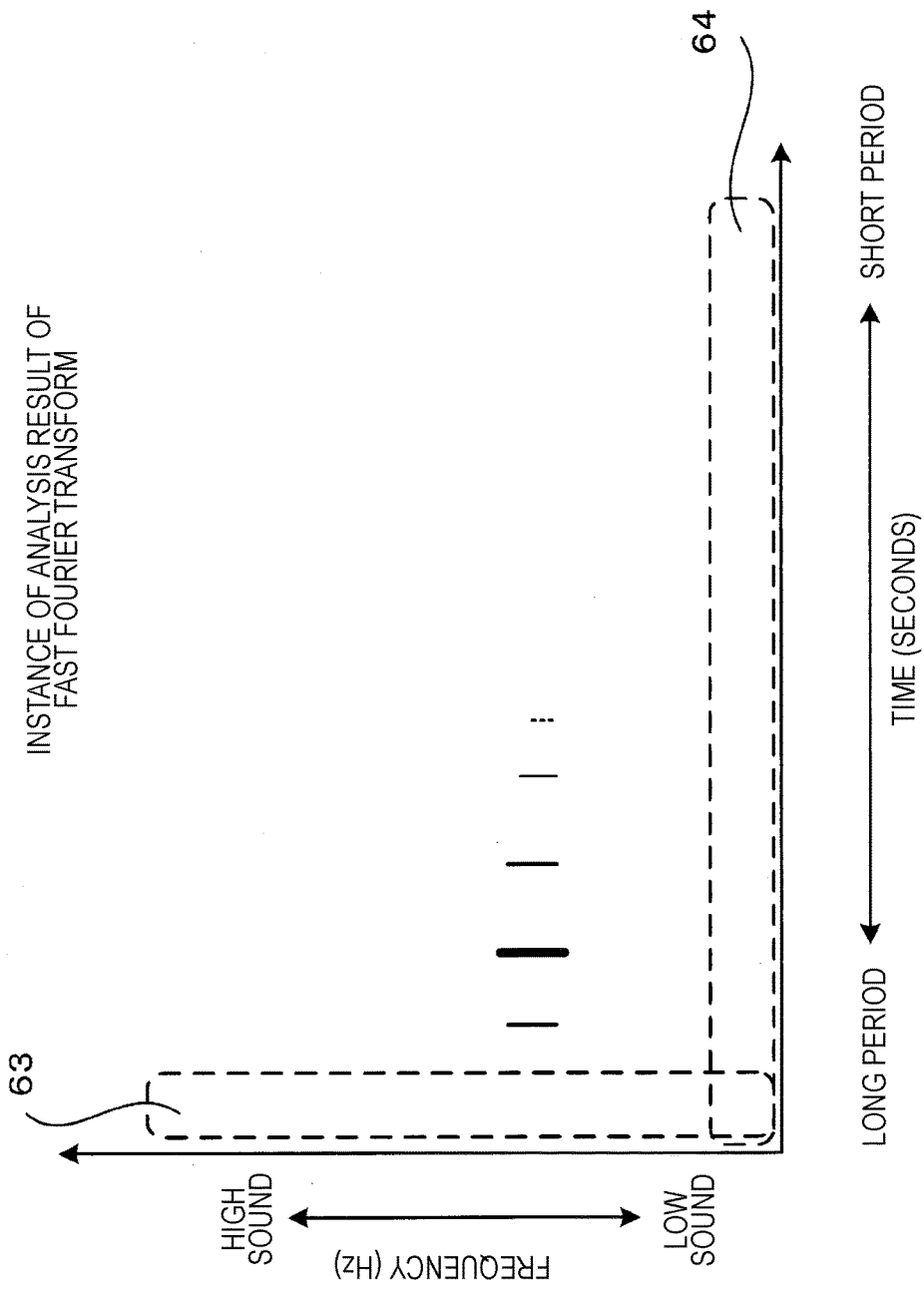
FIG. 14 is a diagram that illustrates an instance of an analysis result of a fast Fourier transform.

As illustrated in FIG. 14, since a signal component having a long period that is a predetermined period or less is considered as a normal operation sound or a noise of an undetermined period, an area of a signal component having such a long period is set as a determination exclusion area 63, and an analysis result of the determination exclusion area 63 is ignored.

In addition, since a signal component having a low frequency that is a predetermined frequency or less is not distinguishable from a normal operation sound, an area of a signal component of such a low frequency is set as a determination exclusion area 64, and an analysis result of the determination exclusion area 64 is ignored.

In the instance illustrated in FIG. 14, by detecting the period and the frequency of a signal of the frequency component for which the fast Fourier transform is performed, periods and frequencies of abnormal sounds are specified. As described above, since harmonic sound components and the like are included in an abnormal sound, there are cases where plural periods are detected.

For instance, period information acquired by performing the fast Fourier transform for the frequencies f1, f2, and f3 described above are illustrated in FIGS. 15 and 16. In the instance illustrated in FIG. 15, a period of 5.2 seconds is acquired for all the frequencies f1, f2, and f3, and accordingly, the period information of an abnormal sound is determined to be 5.2 seconds.

However, in the instance illustrated in FIG. 16, different values of periods that are 5.2 seconds for the frequency f1, 7.8 seconds for the frequency f2, and 10.5 seconds for the frequency f3 are determined.

In such a case, the control unit 33 may be configured to extract a period of a frequency for which the value of a calculated total sum of sound intensities for each frequency is largest among periods of frequencies of plural abnormal sounds as period information of an abnormal sound.

Figure 17:
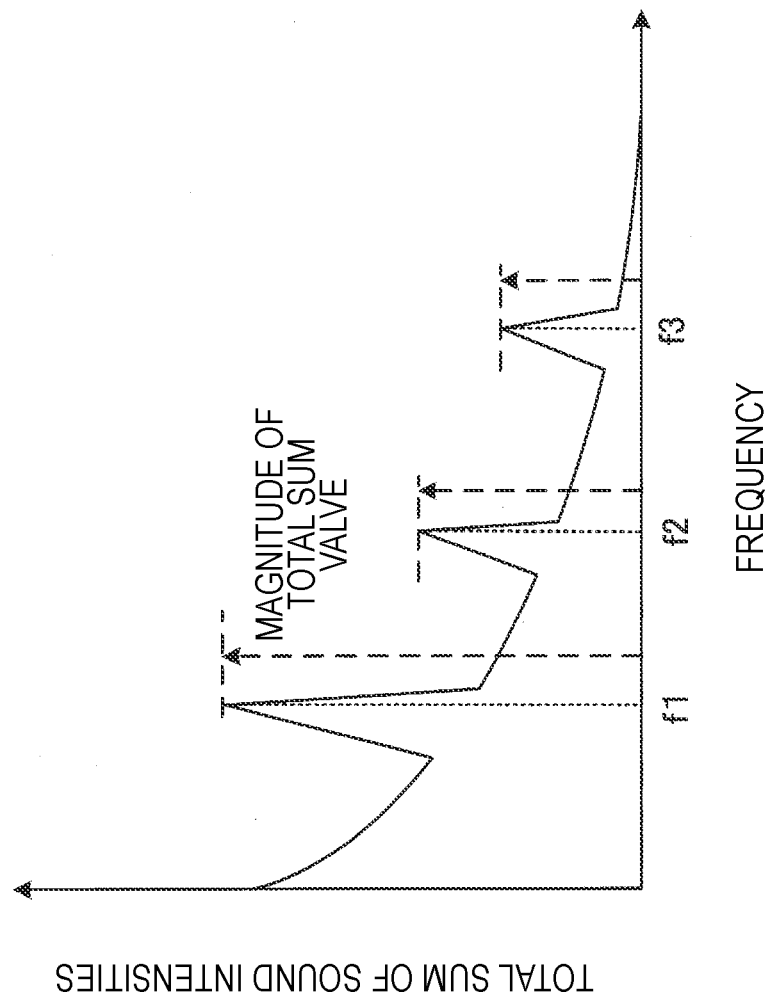
FIG. 17 is a diagram that illustrates the magnitude of a total sum value in a graph of a total sum of sound intensities for the frequencies.

Specifically, as illustrated in FIG. 17, the period of 5.2 seconds for the frequency f1 for which, among the values of the total sums at the peaks of the frequencies f1, f2, and f3, the value is largest is set as the period information of an abnormal sound.

In addition, since there are cases where the sound intensities of a second harmonic sound and a third harmonic sound are lower than that of a base sound, there is a component that is not detected in a case where a fast Fourier transform is performed, and there are cases where a period that is longer than an actual period is detected. For instance, as illustrated in FIG. 18, there are cases where, while a period of 5.2 seconds is detected for the frequency f1 of the base sound, a period of 10.4 seconds is detected for the frequencies f2 and f3 that are harmonic components.

For this reason, in a case where plural frequencies of abnormal sounds are specified, and plural abnormal sound periods are detected through an analysis performed by the frequency analyzing unit 32 for the plural specified frequency components of abnormal sounds, the control unit 33 may be configured to extract a shortest period of 5.2 seconds among periods of the plural frequencies of abnormal sounds as the period information of an abnormal sound.

The abnormal sound diagnostic apparatus 10 transmits information of the frequency and the period of the abnormal sound based on an analysis result of the fast Fourier transform to the server apparatus 50 together with model information and information of an operation state (Step S106). For instance, information indicating that the frequency of the abnormal sound is f1 (kHz), and the period of the abnormal sound is 5.2 seconds is transmitted to the server apparatus 50.

The server apparatus 50 searches the waveform data storing unit 53 based on the received information, thereby extracting data of a frequency spectrum waveform corresponding to the received information (Step S107).

The server apparatus 50 transmits the extracted frequency spectrum waveform data to the abnormal sound diagnostic apparatus 10 together with information of original sound data, a cause of the abnormal sound, a countermeasure thereof, and the like (Step S108).

Then, the abnormal sound diagnostic apparatus 10 receives the frequency spectrum waveform data transmitted from the server apparatus 50 (Step S109). The control unit 33 of the abnormal sound diagnostic apparatus 10 displays the received frequency spectrum waveform and a frequency spectrum waveform acquired through the STFT on the display unit 35 (Step S110).

Figure 19:
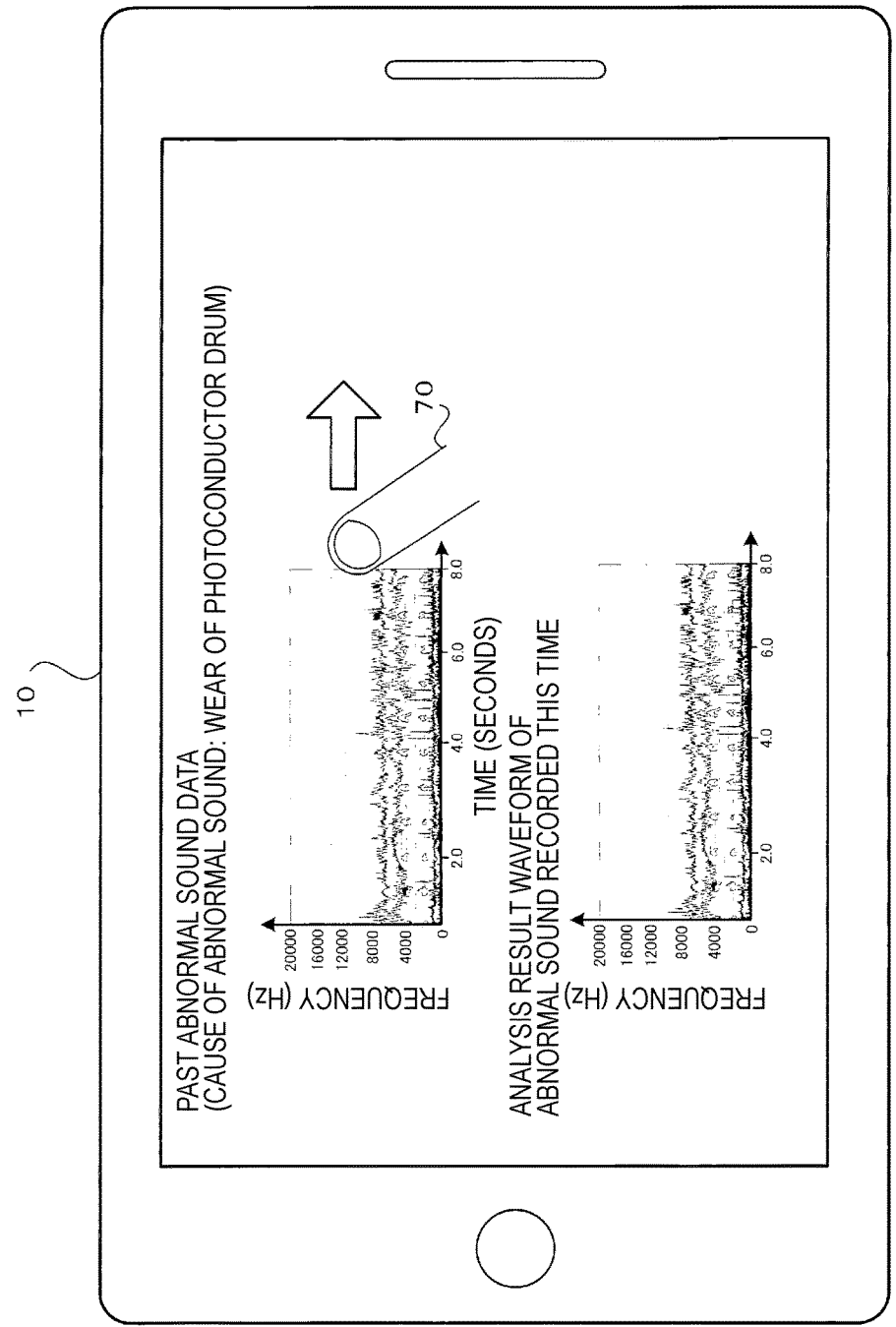
FIG. 19 is a diagram that illustrates an instance of a screen of an abnormal sound diagnostic apparatus 10 on which two frequency spectrum waveforms are displayed.

An instance of the screen of the abnormal sound diagnostic apparatus 10 on which the two frequency spectrum waveforms are displayed in this way is illustrated in FIG. 19.

In the instance of the screen illustrated in FIG. 19, it can be understood that the frequency spectrum waveform acquired through the STFT by the frequency analyzing unit 32 is displayed as "Analysis Result Waveform of Abnormal Sound Recorded This Time", the frequency spectrum waveform transmitted from the server apparatus 50 is displayed as "Past Abnormal Sound Data" together with a cause of the abnormal sound of "Wear of Photoconductor Drum".

A service engineer performing an abnormal sound diagnosis determines whether abnormal sound components included in the waveforms are similar to each other by comparing the two frequency spectrum waveforms, thereby specifying a cause of the abnormal sound.

Figure 20:
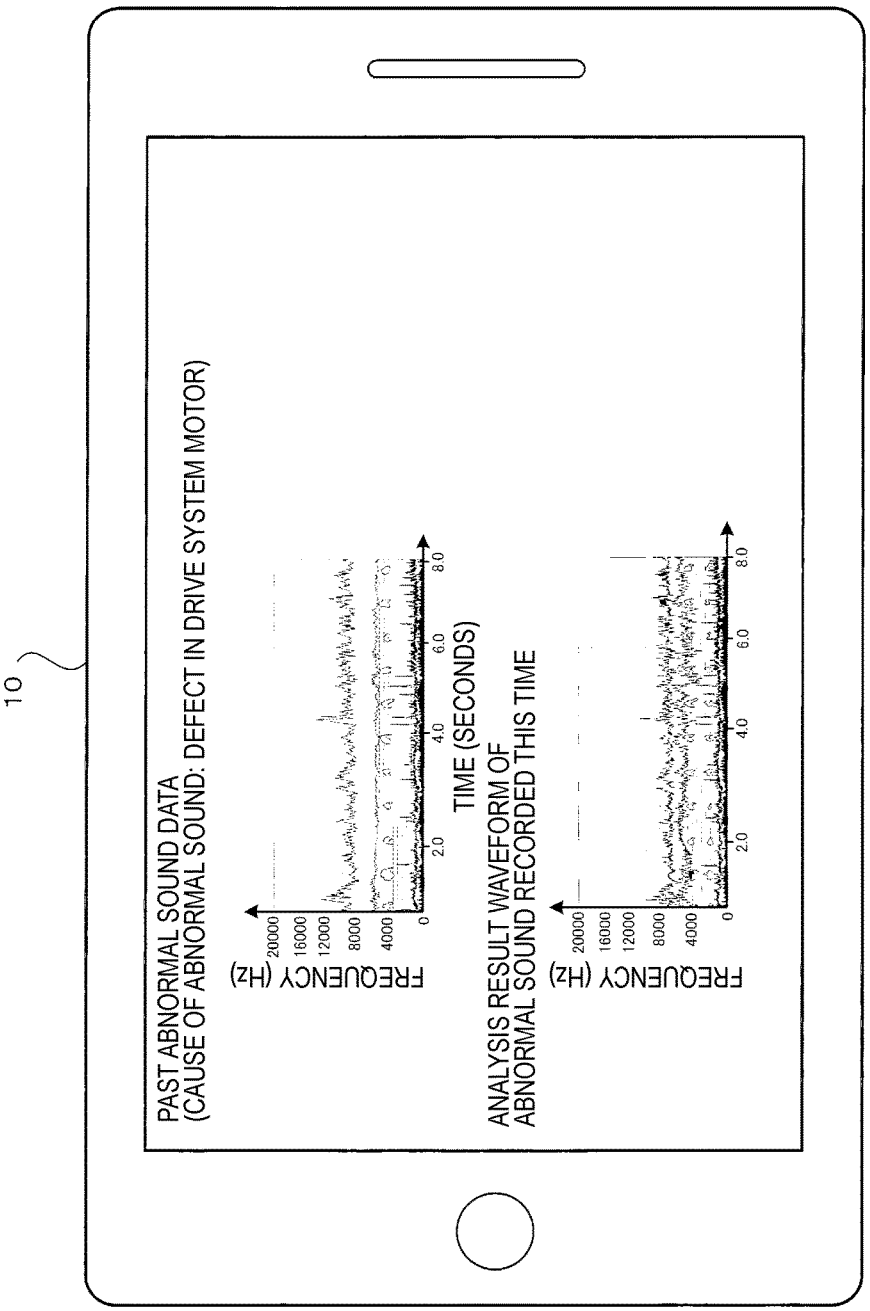
FIG. 20 is a diagram that illustrates an instance of an image of a case where another frequency spectrum waveform having a different cause of an abnormal sound is displayed on the instance of the screen illustrated in FIG. 13.

In addition, in a case where plural frequency spectrum waveforms are transmitted from the server apparatus 50, for instance, as an image of the frequency spectrum waveform displayed as "Past Abnormal Sound Data" is traced in the lateral direction through a touch operation using a finger 70, another frequency spectrum waveform is displayed as illustrated in FIG. 20.

FIG. 20 illustrates an instance of an image of a case where the frequency spectrum waveform of an abnormal sound is displayed in a case where the cause of the abnormal sound is "a defect in a driving system motor".

In a case where plural frequency spectrum waveforms are transmitted in this way, the service engineer specifies a cause of the abnormal sound by determining a specific frequency spectrum waveform that is relatively similar to the acquired frequency spectrum waveform of the abnormal sound acquired this time. When a cause of the abnormal sound is specified, not only the shapes of the frequency spectrum waveforms and the periods, the frequencies, and the like of the abnormal sound components are compared with each other but also an abnormal sound acquired this time by reproducing the original sound data using the sound reproducing unit 37 and a sound corresponding to the frequency spectrum waveform transmitted from the server apparatus 50 are compared with each other by listening to them so as to specify the cause of the abnormal sound.

In the abnormal sound diagnostic apparatus 10 according to this exemplary embodiment, the control unit 33 calculates a total sum of sound intensities in the time-axis direction for each frequency in the frequency spectrum waveform data acquired by the frequency analyzing unit 32 and detects a peak in the calculated total sum of sound intensities for each frequency, thereby specifying a frequency of the abnormal sound.

Figure 21:
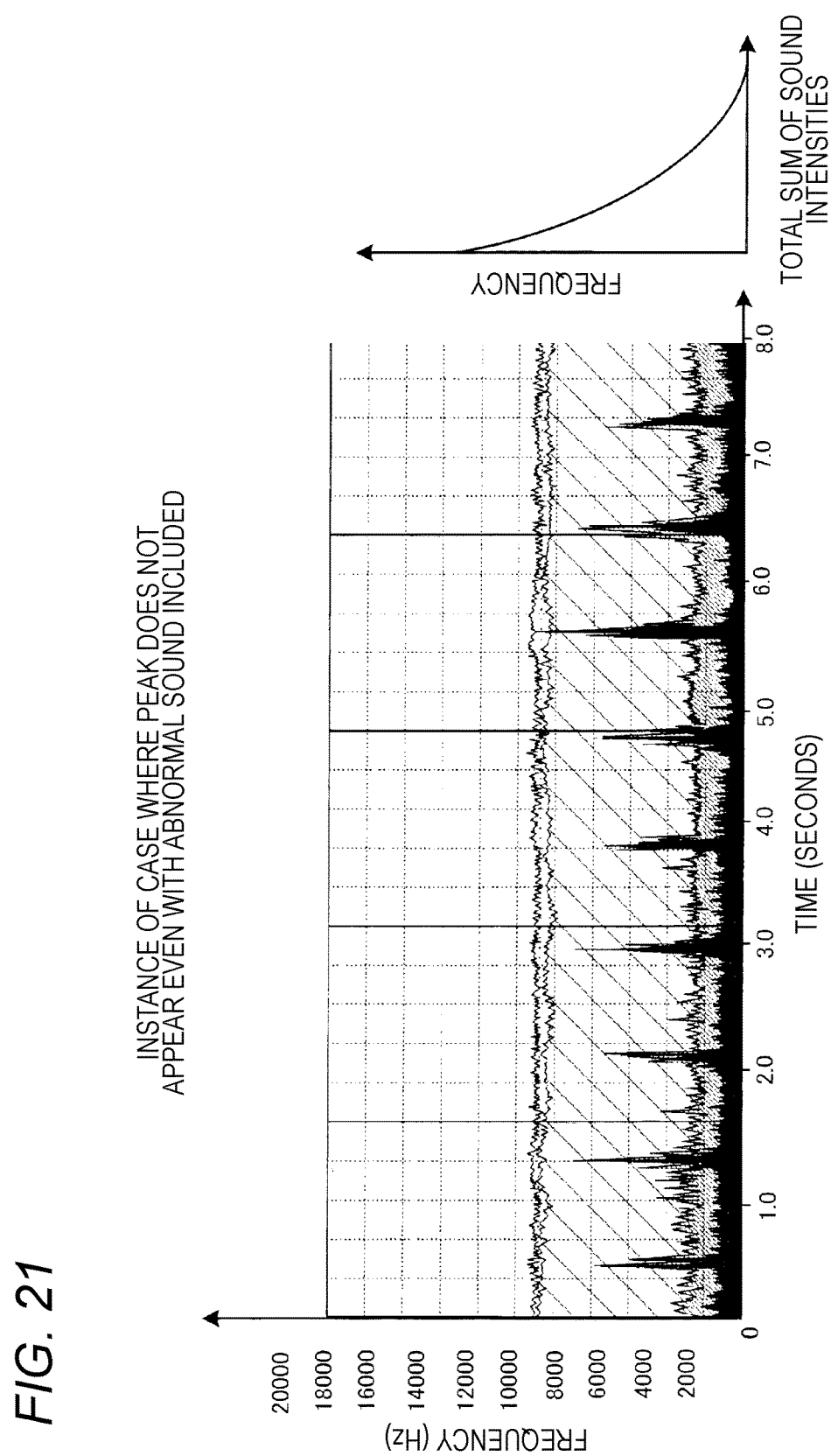
FIG. 21 is a diagram that illustrates an instance of a case where a peak does not occur in a total sum value even in a case where a total sum of sound intensities in the time-axis direction for frequencies is calculated in a frequency spectrum waveform data including an abnormal sound.

However, as illustrated in FIG. 21, in a case where the abnormal sound includes a broad range of frequency components, even when a total sum of sound intensities in the time-axis direction for each frequency in the frequency spectrum waveform data is calculated, there are cases where any peak is not generated in the total sum values.

For this reason, in a case where the control unit 33 cannot specify a frequency of the abnormal sound, the frequency analyzing unit 32 may perform a fast Fourier transform of one or plural frequency components set in advance such as 4 kHz and 8 kHz in the time-axis direction.

Figure 22:
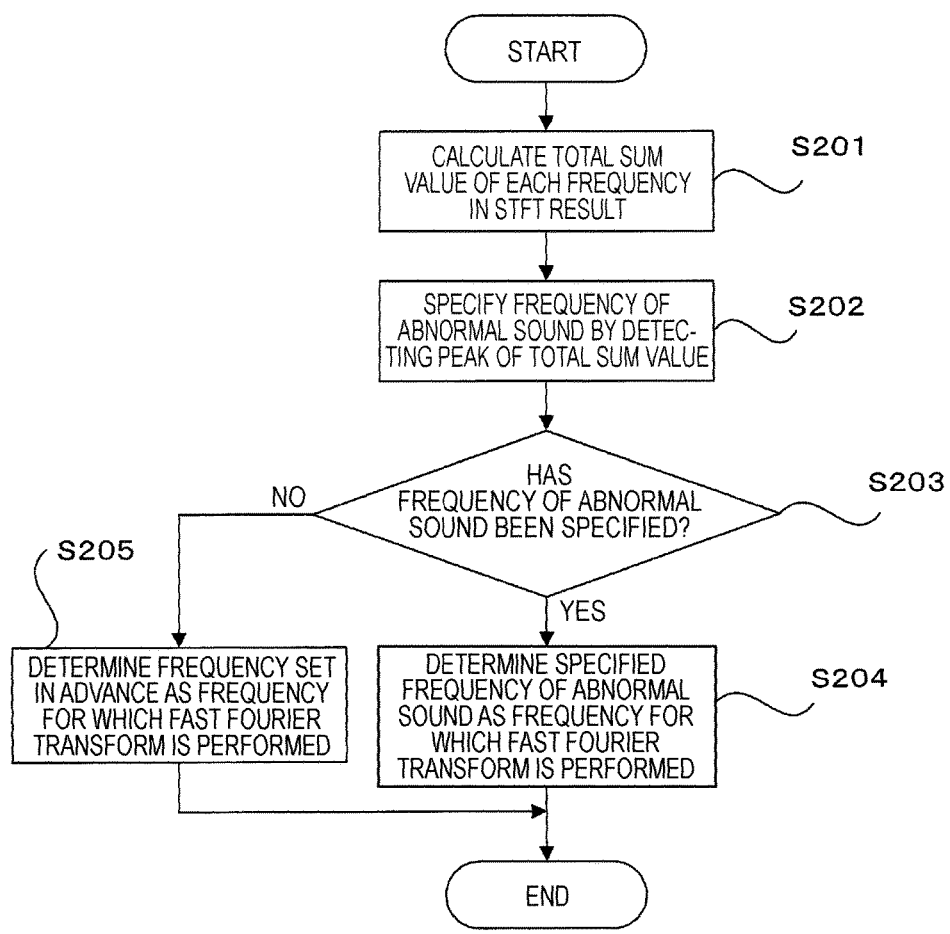
FIG. 22 is a flowchart that illustrates an operation performed at the time of switching a frequency for which a fast Fourier transform is performed between a case where a frequency of an abnormal sound is specified and a case where the frequency is specified.

In this way, the operation of performing switching between frequencies for which the fast Fourier transform is performed between a case where the frequency of the abnormal sound is specified by the control unit 33 and a case where the frequency of the abnormal sound is not specified will be described with reference to a flowchart illustrated in FIG. 22.

First, the control unit 33 calculates a total sum value for each frequency in an STFT analysis result acquired by the frequency analyzing unit 32 (Step S201). Then, the control unit 33 specifies a frequency of an abnormal sound by detecting a peak in the calculated total sum value for each frequency (Step S202).

Here, in a case where the frequency of the abnormal sound can be specified by the control unit 33 (Yes in Step S203), the frequency analyzing unit 32 determines the frequency of the abnormal sound specified by the control unit 33 as a frequency for which a fast Fourier transform is performed and performs the fast Fourier transform (Step S204).

In a case where the frequency of an abnormal sound cannot be specified by the control unit 33 (No in Step S203), the frequency analyzing unit 32 determines a frequency set in advance such as 4 kHz, 6 kHz, or 8 kHz having a high possibility of inclusion of an abnormal sound as a frequency for which the fast Fourier transform is performed and performs the fast Fourier transform (Step S205).

In the description presented above, while the control unit 33 specifies a frequency in which an abnormal sound is included, and the frequency analyzing unit 32 performs a fast Fourier transform of the specified frequency, there is a possibility that the control unit 33 erroneously determines a frequency of a non-abnormal sound as the frequency of an abnormal sound.

Figure 23:
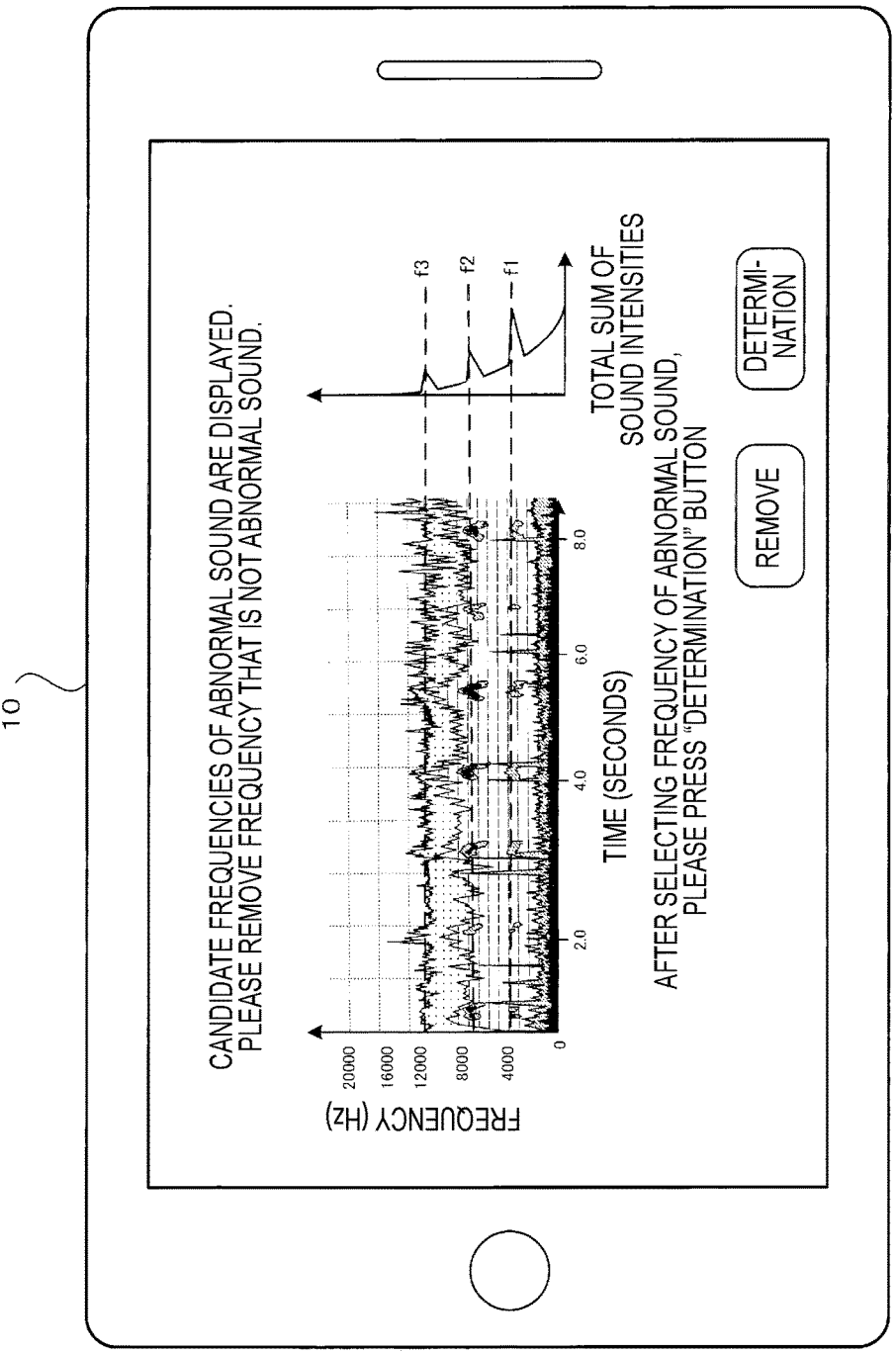
FIG. 23 is a diagram that illustrates an appearance allowing a user to select a frequency for which a fast Fourier transform is performed by displaying candidate frequencies of an abnormal sound using dotted lines on a frequency spectrum waveform.

For this reason, when the frequencies of abnormal sounds are specified by detecting peaks in the frequency spectrum waveform, as illustrated in FIG. 23, the control unit 33 may be configured to display the specified frequencies of abnormal sounds to a user as candidate frequencies and perform a fast Fourier transform of only a frequency selected by the user.

In FIG. 23, candidate frequencies f1, f2, and f3 of an abnormal sound are illustrated on a frequency spectrum waveform using dotted lines, and the user can exclude candidate frequencies determined not to be an abnormal sound from a target for the fast Fourier transform by selecting a frequency determined not to be an abnormal sound and operating a remove button.

When a determination button is operated after the removal of candidate frequencies determined not to be an abnormal sound, the frequency analyzing unit 32 performs a fast Fourier transform only for a selected frequency component among frequencies of abnormal sounds specified by the control unit 33.

In a case where the candidate frequencies of abnormal sounds are displayed, instead of displaying the candidate frequencies on the frequency spectrum waveform using dotted lines as illustrated in FIG. 23, only the candidate frequencies of abnormal sounds may be displayed as a list by using characters.

[Modification Example]

In the exemplary embodiment described above, while a case has been described in which the abnormal sound diagnostic apparatus 10 is a tablet terminal device, the present invention is not limited thereto. Thus, the present invention can be applied also to a case where any other apparatus is used as the abnormal sound diagnostic apparatus. For instance, in a case where an operation panel of the image forming apparatus 20 is configured to be attachable/detachable to/from a main body and communicable with the server apparatus 50 and have a built-in sound signal acquisition function, the operation panel may be used as the abnormal sound diagnostic apparatus.

In addition, in the exemplary embodiment described above, while a case has been described in which the abnormal sound diagnostic apparatus 10 has the microphone 17 built therein, in a case where a sound recording function is included in the abnormal sound diagnostic apparatus 10, by externally connecting a sound collection device such as a microphone, a sound signal acquiring unit may be realized.

Furthermore, in the exemplary embodiment described above, while a case has been described in which a target apparatus for an abnormal sound analysis is an image forming apparatus, a target apparatus for the abnormal sound analysis is not limited to the image forming apparatus. Thus, the present invention can be similarly applied to any other apparatus having a possibility of generating an abnormal sound having periodicity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A diagnostic apparatus comprising:
   at least one processor configured to execute:
   acquiring sound information from a target apparatus;
   performing a frequency analysis of the sound information and generating frequency analysis result data representing a temporal change in an intensity distribution for each frequency;
   specifying a frequency of an abnormal sound in the frequency analysis result data;
   analyzing a frequency component of the specified frequency of the abnormal sound; and
   extracting period information of the abnormal sound from an analysis result acquired by the analyzing the frequency component.

2. The diagnostic apparatus according to claim 1,
wherein the specifying specifies the frequency of the abnormal sound by calculating a total sum of sound intensities in a time-axis direction for each frequency in the frequency analysis result data and detecting a maximum value of the total sum of sound intensities for each frequency.

3. The diagnostic apparatus according to claim 2,
wherein the specifying, for an area of frequencies set in advance, even in a case where a maximum value is detected, does not specify a frequency of the maximum value as the frequency of the abnormal sound.

4. The diagnostic apparatus according to claim 3,
wherein the area of frequencies set in advance can be set for each type of apparatus.

5. The diagnostic apparatus according to claim 2,
wherein, in a case where a plurality of frequencies of abnormal sounds are specified by the specifying, and a plurality of abnormal sound periods are detected through an analysis of frequency components of the plurality of the specified frequencies of abnormal sounds, the extracting extracts a period of a frequency for which a value of the calculated total sum of sound intensities for each frequency is largest as period information of an abnormal sound among periods of the plurality of frequencies of the abnormal sounds.

6. The diagnostic apparatus according to claim 2,
wherein, in a case where a plurality of frequencies of abnormal sounds are specified by the specifying, and a plurality of abnormal sound periods are detected through an analysis of frequency components of the plurality of the specified frequencies of abnormal sounds, the extracting extracts a period of a frequency for which a difference between a value of the calculated total sum of sound intensities for each frequency and a value of the total sum of sound intensities for an adjacent different frequency is largest as period information of an abnormal sound from among periods of the plurality of the frequencies of the abnormal sounds.

7. The diagnostic apparatus according to claim 2,
wherein, in a case where a plurality of frequencies of abnormal sounds are specified by the specifying, and a plurality of abnormal sound periods are detected through an analysis of frequency components of the plurality of the specified frequencies of abnormal sounds, the extracting extracts a shortest period as period information of an abnormal sound from among periods of the plurality of frequencies of the abnormal sounds.

8. The diagnostic apparatus according to claim 1,
wherein the specifying unit calculates a total sum of sound intensities in a time-axis direction for each frequency in the frequency analysis result data, detects a maximum value of the calculated total sum of sound intensities for each frequency, and specifies a frequency for which a difference between the maximum value and a value of the total sum of sound intensities for an adjacent different frequency is a value set in advance or more as the frequency of the abnormal sound.

9. The diagnostic apparatus according to claim 1,
wherein, in a case where the specifying cannot specify a frequency of an abnormal sound, the analyzing analyzes one or a plurality of frequency components set in advance.

10. The diagnostic apparatus according to claim 1, further comprising:
a communication unit that communicates with an external device;
a transmission unit that transmits information of the period and the frequency of the sound extracted by the extracting to the external device through the communication unit; and
a reception unit that receives data of a frequency analysis result corresponding to the generated frequency analysis result data from an external device through the communication unit,
wherein the at least one processor is configured to control display of the generated frequency analysis result and the frequency analysis result received by the reception unit.

11. A diagnostic apparatus comprising:
at least one processor configured to execute:
acquiring sound information from a target apparatus;
performing a frequency analysis of the sound information and generating frequency analysis result data representing a temporal change in an intensity distribution for each frequency;
specifying frequencies of abnormal sounds in the frequency analysis result data;
control displaying of the specified frequencies of the abnormal sounds;
analyzing a frequency component of a frequency selected from among the specified frequencies of the abnormal sounds; and
extracting period information of the abnormal sound from an analysis result acquired by the analyzing the frequency component.

12. A diagnostic system comprising:
a diagnostic apparatus; and
a server apparatus,
the diagnostic apparatus including:
at least one processor configured to execute:
acquiring sound information from a target apparatus;
performing a frequency analysis of the sound information and generating frequency analysis result data representing a temporal change in an intensity distribution for each frequency;
specifying a frequency of an abnormal sound in the frequency analysis result data;
analyzing a frequency component of the specified frequency of the abnormal sound;
extracting period information of the abnormal sound from an analysis result acquired by the analyzing the frequency component;
a communication unit that communicates with the server apparatus;
a first transmission unit that transmits information of the period and the frequency of the sound extracted by the extracting to the server apparatus through the communication unit; and
a reception unit that receives data of a frequency analysis result corresponding to the generated frequency analysis result data from the server apparatus through the communication unit,
the server apparatus including:
a storage unit that stores data of a plurality of frequency analysis results acquired by performing a frequency analysis of sound information of an abnormal sound; and
at least one processor configured to execute a second transmission unit that, in a case where the information of the period and the frequency of the sound is received from the diagnostic apparatus, selects data coinciding with the received information of the period and the frequency of the sound from among the data of the plurality of frequency analysis results stored in the storage unit, and transmits the selected data to the diagnostic apparatus.

13. A non-transitory computer readable medium storing a program causing a computer to execute a diagnostic process, the diagnostic process comprising:

acquiring sound information from a target apparatus;

performing a frequency analysis of the sound information and generating frequency analysis result data representing a temporal change in an intensity distribution for each frequency;

specifying a frequency of an abnormal sound in the frequency analysis result data;

analyzing a frequency component of the specified frequency of the abnormal sound; and extracting period information of the frequency component from an analysis result acquired in the analyzing of the frequency component.

* * * * *